(12) United States Patent
Wittmann et al.

(10) Patent No.: US 12,235,797 B2
(45) Date of Patent: Feb. 25, 2025

(54) AUTOMATED SERVER-SIDE REFERENCE MAPPING IN RESOURCE REGISTRIES

(71) Applicant: Red Hat, Inc., Raleigh, NC (US)

(72) Inventors: Eric Wittmann, Hartford, CT (US); Carles Arnal Castello, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/097,167

(22) Filed: Jan. 13, 2023

(65) Prior Publication Data

US 2024/0241859 A1 Jul. 18, 2024

(51) Int. Cl.
G06F 16/16 (2019.01)
G06F 16/14 (2019.01)

(52) U.S. Cl.
CPC .......... G06F 16/168 (2019.01); G06F 16/14 (2019.01)

(58) Field of Classification Search
CPC .............................. G06F 16/168; G06F 16/14
USPC ...................................................... 707/705
See application file for complete search history.

(56) References Cited

U.S. PATENT DOCUMENTS

| | | | |
|---|---|---|---|
| 7,107,591 B1* | 9/2006 | Karp | G06F 9/50 718/100 |
| 10,789,220 B2 | 9/2020 | Mayer et al. | |
| 11,003,636 B2 | 5/2021 | Roth et al. | |
| 2005/0275861 A1* | 12/2005 | Ferlitsch | G06F 3/1244 358/1.13 |
| 2007/0101315 A1* | 5/2007 | Dahyabhai | G06F 9/44526 717/120 |
| 2007/0198913 A1* | 8/2007 | Terao | G06F 16/93 707/999.203 |
| 2008/0168109 A1 | 7/2008 | Gaurav et al. | |
| 2009/0249178 A1* | 10/2009 | Ambrosino | G06F 40/131 715/205 |
| 2011/0276925 A1* | 11/2011 | Tumanov | G06Q 10/107 709/224 |

(Continued)

FOREIGN PATENT DOCUMENTS

| | | | | |
|---|---|---|---|---|
| CA | 2396124 A1 | * | 8/2000 | |
| JP | 2004227630 A | * | 8/2004 | .......... G11B 27/034 |
| JP | 2004348313 A | * | 12/2004 | |
| KR | 100725643 B1 | * | 6/2007 | |

(Continued)

OTHER PUBLICATIONS

Misev et al., "A Semantic Resolver for Coordinate Reference Systems", S. Di Martino, A. Peron, and T. Tezuka (Eds): W2GIS 2012, LNCS 7236, pp. 47-56, 2012. (Year: 2012).*

(Continued)

*Primary Examiner* — Phuong Thao Cao

(74) *Attorney, Agent, or Firm* — Kilpatrick Townsend & Stockton LLP

(57) ABSTRACT

Systems and methods for automated server-side reference mapping in a resource registry are disclosed herein. An example system comprises a registry with a unique coordinate system; an automated registry server connected to the registry, configured to receive a resource to be registered in the registry; process the contents of the resource to identify a target reference; search the registry for the target reference using information specific to the target reference; analyze potential candidate matches for the target reference, in a search result of the search; and resolve the target reference based on the analysis of the candidate matches.

20 Claims, 5 Drawing Sheets

(56) References Cited

U.S. PATENT DOCUMENTS

| | | | | |
|---|---|---|---|---|
| 2012/0278694 | A1* | 11/2012 | Washio | G06F 40/197 |
| | | | | 715/255 |
| 2013/0305137 | A1* | 11/2013 | van der Heijden | G06F 40/12 |
| | | | | 715/255 |
| 2015/0066567 | A1* | 3/2015 | Shami | G06Q 10/06315 |
| | | | | 705/7.25 |
| 2015/0120767 | A1* | 4/2015 | Skeen | G06F 16/335 |
| | | | | 707/754 |
| 2017/0061416 | A1* | 3/2017 | Morate | G06F 16/5854 |
| 2017/0308511 | A1* | 10/2017 | Beth | G06F 40/169 |
| 2018/0324546 | A1* | 11/2018 | Jones | G08G 5/0034 |
| 2019/0132378 | A1* | 5/2019 | Perl | G06F 16/9566 |
| 2020/0034990 | A1* | 1/2020 | Simpson | G01J 3/463 |
| 2021/0073179 | A1* | 3/2021 | Berman | G06F 16/1873 |
| 2023/0229281 | A1* | 7/2023 | Turner | G06F 3/013 |
| | | | | 345/156 |
| 2023/0244542 | A1* | 8/2023 | Gottipati | G06F 9/5077 |
| | | | | 718/1 |
| 2024/0062465 | A1* | 2/2024 | Standingford | G06V 10/761 |

FOREIGN PATENT DOCUMENTS

| | | |
|---|---|---|
| KR | 102455521 B1 | 10/2022 |
| NL | 2024002 A * | 7/2020 |

OTHER PUBLICATIONS

Tran et al., "Automated Reference Resolution in Legal Texts", Artificial Intelligence and Law (2014) 22: pp. 29-60, Springer, Mar. 2014. (Year: 2014).*

Hevo Data Inc., "Hevo Schema Mapping—Automate Schema Detection and Mapping," Nov. 20, 2017, 6 pages.

Neamtiu, et al., "Improving Cloud Availability with on-the-Fly Schema Updates," Department of Computer Science and Engineering, University of California, USA; Laboratoire d'Informatique de Grenoble, Universite de Grenoble, France, Dec. 19-21, 2013, 11 pages.

Sahay, "Schema Matching using Machine Learning," College of Information and Computer Sciences University of Massachusetts, Nov. 24, 2019, 7 pages.

* cited by examiner

AUTOMATED SERVER-SIDE REFERENCE MAPPING IN RESOURCE REGISTRIES

BACKGROUND

Server and distributed systems contain registries that can serve as databases for registry applications and files. Registries or server registries may utilize their own coordinate system to store, index, and reference data resources, files, and objects. When registering new resources in the registry, for example new schemas, the resources can contain references to target resources or data objects in the registry. Each server or registry application may use a specific referencing scheme, for example a JSON schema will reference resources in the registry differently to other file types such as an OpenAPI schema with its own referencing scheme.

SUMMARY

The present disclosure provides new and innovative systems and methods for automating server-side reference mapping in a resource registry. In one example a system comprises a registry with a unique coordinate system; an automated registry server connected to the registry, configured to receive a resource to be registered in the registry; process contents of the resource to identify a target reference; search the registry for the target reference using information specific to the target reference; analyze potential candidate matches for the target reference, in a search result of the search; and resolve the target reference based on the analyzing of the candidate matches.

In an example a method is disclosed, comprising receiving a resource to be registered in a registry; processing the contents of the resource to identify a target reference; searching the registry for the target reference using information specific to the target reference; analyzing candidate matches for the target reference, in a search result of the search; and resolving the target reference based on the analyzing of the candidate matches.

In an example a non-transitory machine readable medium storing code, is disclosed, which when executed by a processor is configured to receive a resource to be registered in a registry; process the contents of the resource to identify a target reference; search the registry for the target reference using information specific to the target reference; analyze potential candidate matches for the target reference, in a search result of the search; and resolve the target reference based on the analyzing of the candidate matches.

Additional features and advantages of the disclosed method and system are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
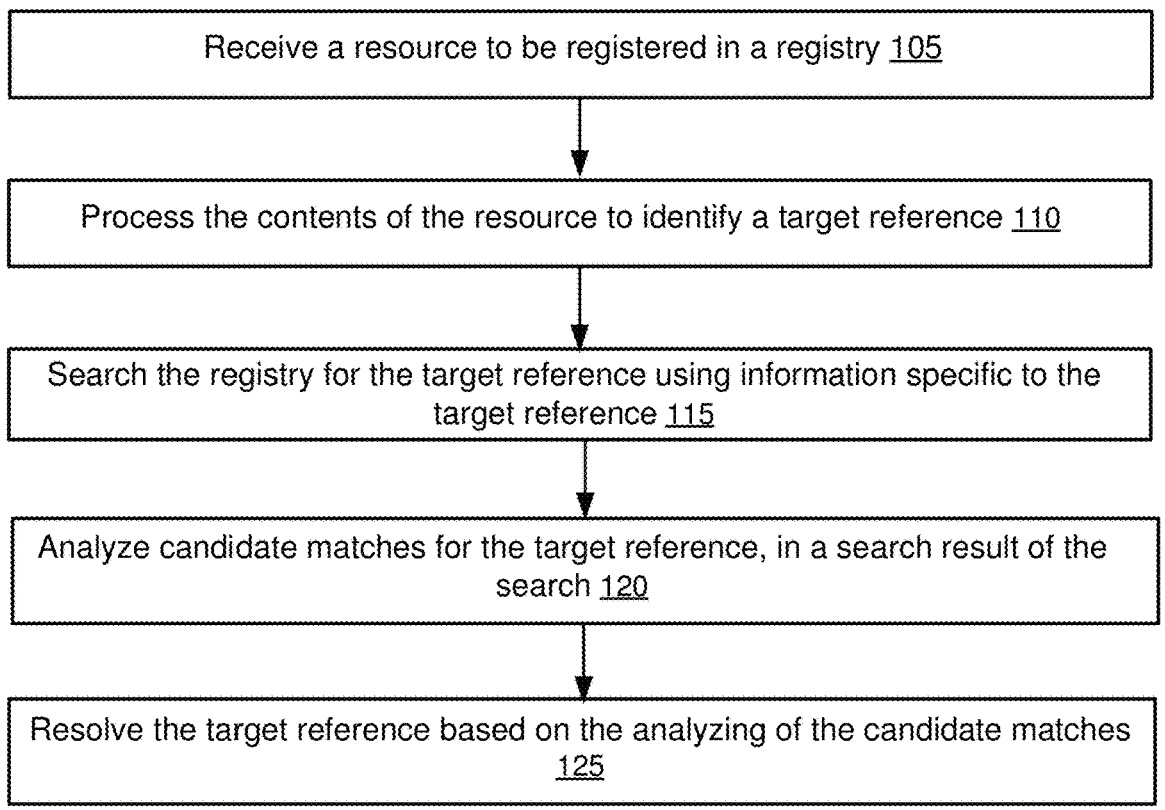
FIG. 1 illustrates a method to autonomously resolve references between different reference coordinate schemes, according to at least one aspect of the present disclosure.

Techniques are disclosed herein for unifying all referencing schemes in an automated system able to map references in source resources to target resources in a server registry. Source resources can contain references to the target resources, these references are referred to herein as target references. Server registries (or "registries"/ "registry") contain various types of artifacts and data objects (collectively referred to herein as "artifacts"). These artifacts can be referenced by applications (referred to as "registry applications" or "registry apps") or resources of these applications. These registry apps are responsible for storing (aka registering) application resources such as API designs (OpenAPI, AsyncAPI, WSDL) and data type definitions (aka schemas like Avro, Protobuf, XML Schema). The resources of these registry applications can be fully defined within the scope of a single stored file, or they can optionally contain references to other resources that may also be stored in the registry.

These registry applications may also rely on the data stored in a server registry to execute various functions, events, and calls. Registries may have the same file or artifact referencing scheme as the registry applications and therefore when a registry application references a specific artifact in the registry, which uses the same scheme for storing and/or indexing the artifact, it can use the registry's reference scheme and is able to retrieve the location of the artifact on the registry using the reference.

However, many server and distributed systems use a variety of registry applications with a variety of referencing schemes, generally while one or two may have a similar scheme to the registry, other registry apps may have different schemes. In various instances, a server registry has its own independent coordinate referencing scheme, which is unique and unrelated to any registry app. In these examples, a user or administrator who is installing an application for example, must manually resolve a reference from the language or referencing scheme of the registry app and the referencing scheme of the registry server. This is resource intensive and slows down installation and updates of registry applications on servers.

In practical terms whenever source resources contain references to other target resources already stored in the registry, the semantics of the reference may break when storing the new source resources in the registry. This can happen despite all necessary resources existing in the registry whenever the location of a resource within the registry, and thus the method for accessing it, differs from traditional local file or remote resource semantics. In one example, Resource A might contain a reference (in the contents of the resource) to Resource B by using the local name (e.g. file location) of Resource B. However, if the registry does not use simple filenames to identify resources stored in it, then such a reference will not work when it comes time to resolve it. Furthermore, syntax for how a resource references a target resource will differ depending on the type of the resource. So the syntax for an Avro resource will differ from that of an OpenAPI resource.

For example if the file being registered is put in a registry location of "/all-schemas/projects/foo/new-file.proto" *AND* if "some-thing.proto" is already registered at location "/all-schemas/projects/foo/directory/things/some-thing.proto" then normal resolution will just work, and no mapping between "./directory/things/some-thing.proto" and some other coordinate system is necessary. And as a result, automatic mapping is not relevant nor necessary. But for example, for registries that use non-file based coordinate systems, the disclosed systems and methods disclosed herein are needed.

This disclosure provides systems and methods to enhance and improve a registry server whereby the registry server can detect resource references during registration and automatically resolve them. This means that users no longer need to provide the reference mappings themselves when registering a resource (for example a schema). The disclosure does this by providing automated unified systems and methods of mapping source coordinate system to a common registry based target coordinate system.

The systems and methods herein require that in most embodiments, that first, all referenced resources be already registered in the registry. If a resource being registered references another resource that is not yet registered, the server will reject the content. Secondly the resource being registered is one of the types supported by the registry and is a valid reference. Once these prerequisites are met then the systems and methods herein may automatically resolve any references during the registration of a new resource on a server.

FIG. 1 illustrates a method to autonomously resolve references between different reference coordinate schemes, according to at least one aspect of the present disclosure. Method 100 for registering a data resource ("source resource") to a registry may begin by the server receiving 105 a resource to be registered in a registry. The source resource may for example be a new schema. The receiving may occur at any memory location or node in a server or distributed system. Once a source resource is received, method 100 continues to process 110 the contents of the resource to identify a target reference. For example, a server or receiving processor, may process the source resource to look for references in the source resource that points to target resources in one or more locations in the registry. The target references are references to these target resources.

Processing 110 largely depends on the source resource type that was received and that type of referencing schemes it uses to define target references in its contents. For example, some resources or data types use keywords, while others make use of URLs. More specifically, for Avro resources the fields that are potential schema or target references are known as records. For JSON Schema resources, the target references can be identified as those terms following the $ref keyword. For Protobuf resources, the potential target references are called imports. Therefore, processing 110 uses logic specific to the resource type to discover all potential references in the content of the resource.

Method 100 can continue with a search 115 of the registry, for the target reference using information specific to the target reference. This may be a search across the whole or a portion of the registry for the data type of the reference that was identified via processing 110. For example if specific metadata or names are relevant to a target resource reference that is pointed to by the source resource, then the search would contain these specific metadata and would search the server registry for these. The search may return no matches, in which case either another search may be automatically conducted, or the target reference is rejected and is not registered by the server.

In instances where one or more search results that are potential or candidate matches for being target resources are returned, then the candidate matches in a search result of the search are analyzed 120 for the target reference. For example analysis 120 may include the server iterating through the candidate matches and analyzing their contents, other metadata, or linked information for further matches to the target resource referenced by the target reference in the source resource.

Finally, the server can resolve 125 the target reference based on analyzing 120 of the candidate matches. Resolving 125 can include various actions, for example if a match out of the candidate matches is not found, then the target resource may not be registered, or is rejected. If a match out of the candidate matches is found then a mapping may be created between the reference in the resource being registered and the coordinates of the matching target resource. In various aspects, if matches are found for all references, then the received source resource may be registered in the server registry with all included mappings for all references.

Figure 2:
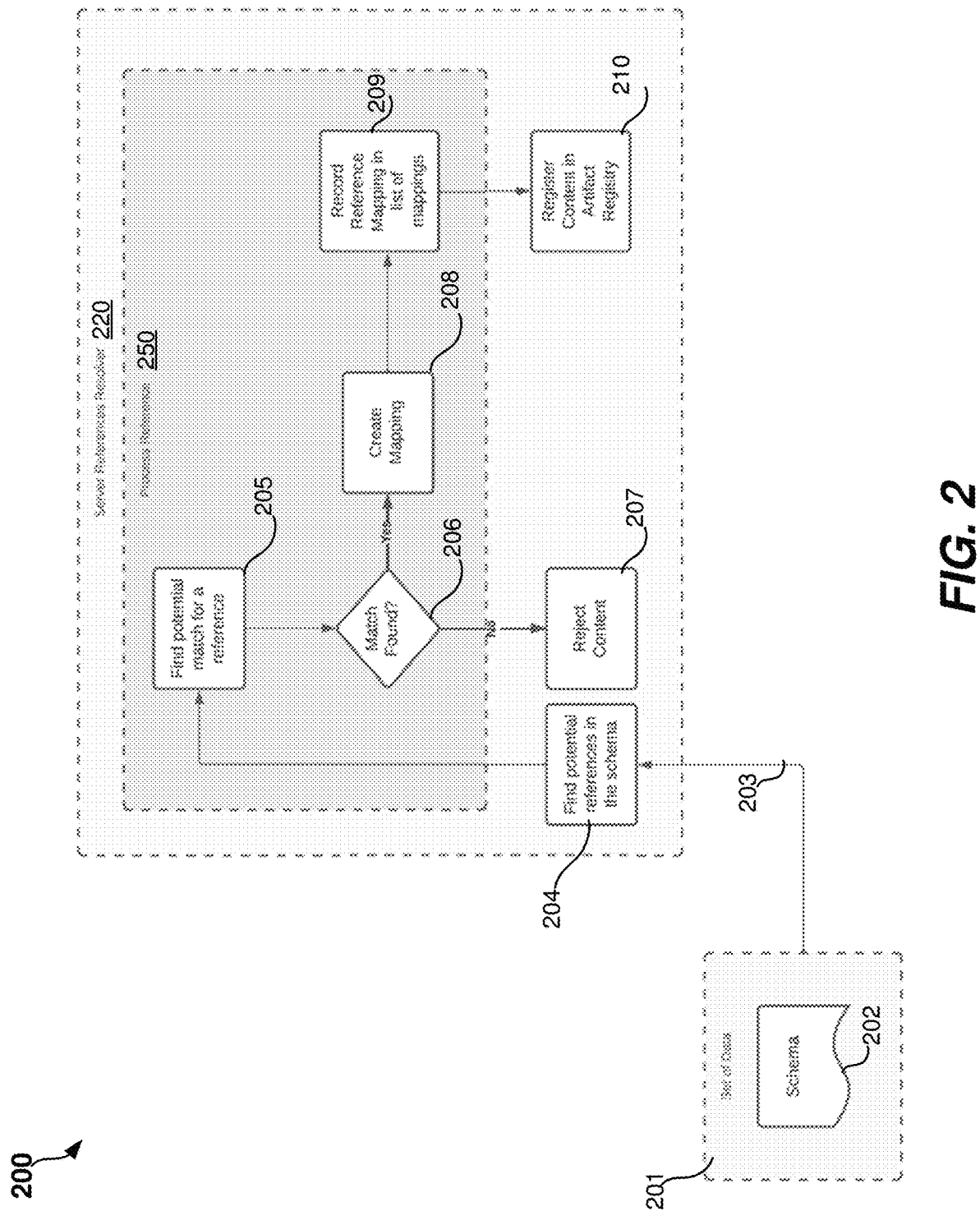
FIG. 2 illustrates autonomous server-based resolution of references between different referencing coordinate schemes, via disclosed systems according to at least one aspect of the present disclosure.

FIG. 2 illustrates autonomous server-based resolution of references between different referencing coordinate schemes, via systems according to at least one aspect of the present disclosure. System 200 may include a set of data 201, which may be data generated by one or more registry applications. Set of data 201 may contain a source resource 202, such as a data file or a schema with references to locations and artifacts in a server registry. Non-limiting examples can include an Avro Schema, a JSON schema. The registry app may register 203 source resource 202 with a server registry. Upon registration 203, then a server references resolver 220, which may be a software, virtual, or hardware module, or a combination thereof, may initiate an automated method, such as method 100, FIG. 1, to resolve any references in source resource 202.

Server references resolver 220 finds 204 potential references in the source resource 202, this may be similar or identical to process 110, FIG. 1. In one example source resource 202 may be an Avro schema, which references com.kubetrade.schema.common.Exchange. Finding 204 the reference locates this reference in the Avro schema. It may also find other metadata associated with the reference, for example the namespace portion may be com.kubetrade.schema.trade, while the name may be "exchange", another metadata be the may "type" com.kubetrade.schema.common.Exchange. The processing may also include determining the most relevant metadata, information, or portions of such information or metadata in source resource 202 to the target reference and/or the server registry. Processing may also include selecting specific search terms or identifying portions of the references in source resource 202 that may be used.

For each reference that is found 204 in source resource 202, server references resolver 220 undertakes a processing 250 of the reference in relation to the server registry and the references it stores. Processing 250 may begin by server reference resolver 220 finding 205 potential matches for a reference across the server registry database. This may include conducting a search, such as search 115, FIG. 1, across the registry for the information, data, labels, and metadata that was found 204 in the source resource 202 or its contents. The search may for example include "exchange" which is the name, or it may include com.kubetrade.schema which is a portion of the namespace. Multiple searches may be conducted consecutively, in parallel, or serially. Search results may be returned 206 by the registry, if no matches are returned then the reference that was found 204 is rejected 207 by server references resolver 220.

If search results are returned 206 then references resolver 220 may create 208 a mapping between the reference in source resource 202 and the target reference location in the server registry. References resolver 220 may also record 209 the mappings in a list of mappings that is maintained by the server, the registry or both. Finally, once the references are mapped 208 and recorded 209, source resource 202 may be saved or registered 210 along with its content in the registry.

Figure 3:
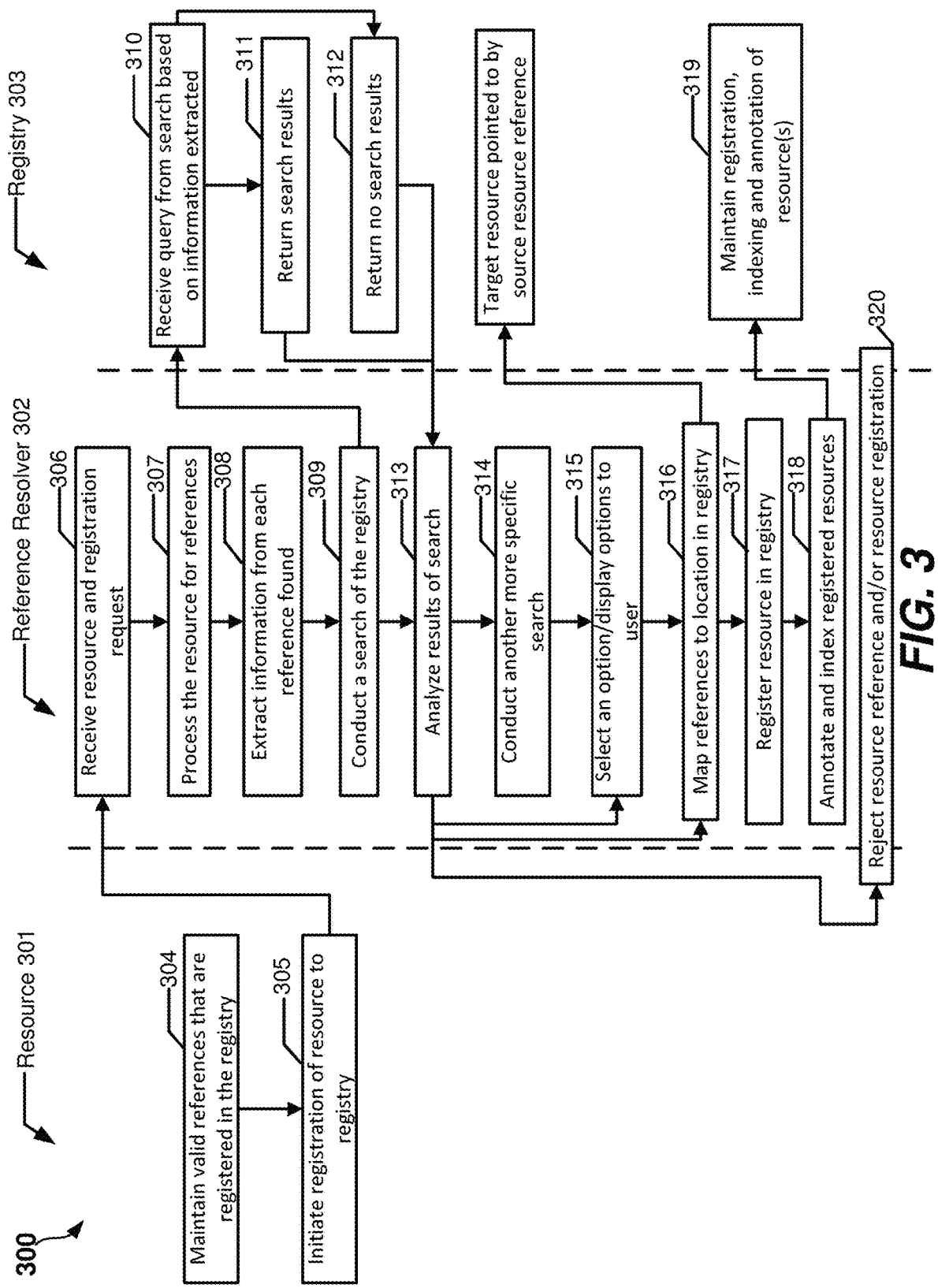
FIG. 3 illustrates a references resolver, a resource to be registered and a server registry in a system an automated reference resolution method, according to at least one aspect of the present disclosure.

FIG. 3 illustrates a references resolver, a resource to be registered and a server registry in a system an automated reference resolution method, according to at least one aspect of the present disclosure. The system 300 can comprise the source resource 301, which may be similar to the source resource 202, FIG. 2. System 300 can comprise a reference resolver 302 that can correspond with server reference resolver 220, and system 300 can comprise a server registry 303, which is a database or other storage mechanism or filing system where a location of a resource or artifacts may be recorded, and where a resource or artifact may be stored. Registry 303 may have a unique coordinate system, which is different to referencing schemes used by registry applications, or other registries. In several embodiments, a registry may even have several different or multiple unique coordinate systems or referencing schemes, which may be used to segregate certain portions of the registry from the others.

The source resource in system 300 contains and maintains 304 valid references that are registered in registry 303. When resource 301 is to be registered, or a registration process is initiated 305, then this request is sent and received 306 by reference resolver 302. The resource may then be processed 307 by reference resolver 302. This may be similar to processing 110, FIG. 1. Processing 307 of the contents of resource 301 can comprise parsing the contents for potential target references. The target references are references to target resources stored or managed by registry 303, pointed to by the reference. This could for example be line by line parsing of a resource 301 file until something that matches or is identified as a reference is found. In various aspects processing 307 of the contents of the resource can include identifying a potential target reference. This may include comparing the reference or potential reference that is found with a list of reference styles, or referencing schemes of the data type of that specific resource 301.

In various aspects, processing 307 can include determining or ensuring that a data type of the potential target reference is a valid data type and is supported by the server registry. This could be done by checking the data types against valid or available data types to the server. Furthermore, processing 307 of resource 301 for references can include recognizing, that a potential target reference in the contents of resource 301 is a target reference. Specific algorithms may be deployed for each data type, which select what the data type can look like, and if the reference meets a certain number of criteria, or meets/exceeds a specific threshold in being similar to a reference of a data type then it may be recognized as a valid reference of that data type by reference resolver 302.

For each reference that is found or identified to be a target reference that resource 301 is pointing to, reference resolver 302 can extract 308 data, metadata, or information from the potential reference that can be used to uniquely identify the target resource it might point to in registry 303. This information will be specific to each resource 301 and reference type. For example, a Protobuf resource might have a statement import "libs/api/http.proto". This statement may in part or in whole be used to search the registry for a matching resource.

Once information is extracted 308, the information may be used to conduct a search 309 of the registry for that reference in registry 303, which can in several aspects receive 310 a query from reference resolver 302, and return 311 search results to reference resolver 302, or if there are no matches, return no results 312 to reference resolver 302. Search results returned 311 to reference resolver 302 can include potential or candidate matches. Search 309 can be conducted using the information extracted 308, and comprise of searching all resources in registry 303, of the data type of the resource and/or of the resource that is the target reference. The candidate matches may be returned 311 as a list of candidate resources or matches that, for example are stored in the registry, which may be the target for resource 301.

Searching 309 can have adjustable heuristics, for example where exact matches are not needed, but a name or other metadata of a target resource may have other parts that fully or partially match the search 309 terms. For example, in some searches 309 what search 309 looks for is an artifact's file name, in others, search 309 you may look for an exact match of a namespace/URL/domain. In one example of a URL reference, the target reference in resource 301 may be broken into various sections, and searches 309 may be run for each various sections separately, or in parallel.

Searches 309 can also include searches in or be conducted on contents of artifacts in registry 303, for example the search may include terms in the contents of the file, and the server runs the search looking at the contents of artifacts, and basing the returned 311 results based on the content and/or metadata in the search terms used.

In several embodiments, registered resources in registry 303 may be annotated with useful metadata to increase the efficiency of searches and improve the results returned 311, 312. For example, users could include a filename as a searchable property whenever they register a resource. So even though the registry does not natively organize resources using filenames, such metadata can be optionally added. In several embodiments, registry 303 may be configured to automatically annotate registered resources with metadata to improve the visibility of resources on searches 309.

Reference resolver 302, may then analyze 313 the returned results from registry 303. This can include iterating through the list of candidate resources and analyze the content of each to determine if it is a match for the target reference in resource 301. In several embodiments, the contents of resources in the registry 303 may be indexed, to make searching 309 or analyzing 313 more efficient.

Analyzing 313 may lead to requiring another search to be conducted 314. For example if the registry 303 returned no results 312, or results returned 311 were not similar enough to the search terms or the target reference, then another search may be conducted based on different terms that may be more specific, or terms that are based on the analysis that was conducted on the first set of search results, or the contents of the first set of search results. Analysis 313 may also lead references resolver 302 to select one of the candidate matches/potential target references that were returned, based on the similarity of the metadata, file name or of the result to the target reference or the search terms, or alternatively it may present or display 315 the options to a user to select from results returned 311 manually.

Once a match is found or a candidate match is automatically or manually selected 315, then the target reference of resource 301 is mapped to the target resource in registry 303 that matches the target reference. Once all or a certain number of target resources are mapped to source resource 301 and its target references, then resource 301 can be registered 317 as a resource in registry 303. In numerous embodiments, the registered resources, their contents and/or metadata can be annotated and/or indexed 318 to improve searching and analysis of the stored and registered resources maintained 319 by registry 303. References resolver 302 may also reject 320 either registration of resource 301, or the target reference, either because of no matches returned 312, because the matches were not similar enough to the search parameters/terms, or because the target resources were invalid, not registered properly, or had other issues preventing referencing by resource 301.

Figure 4:
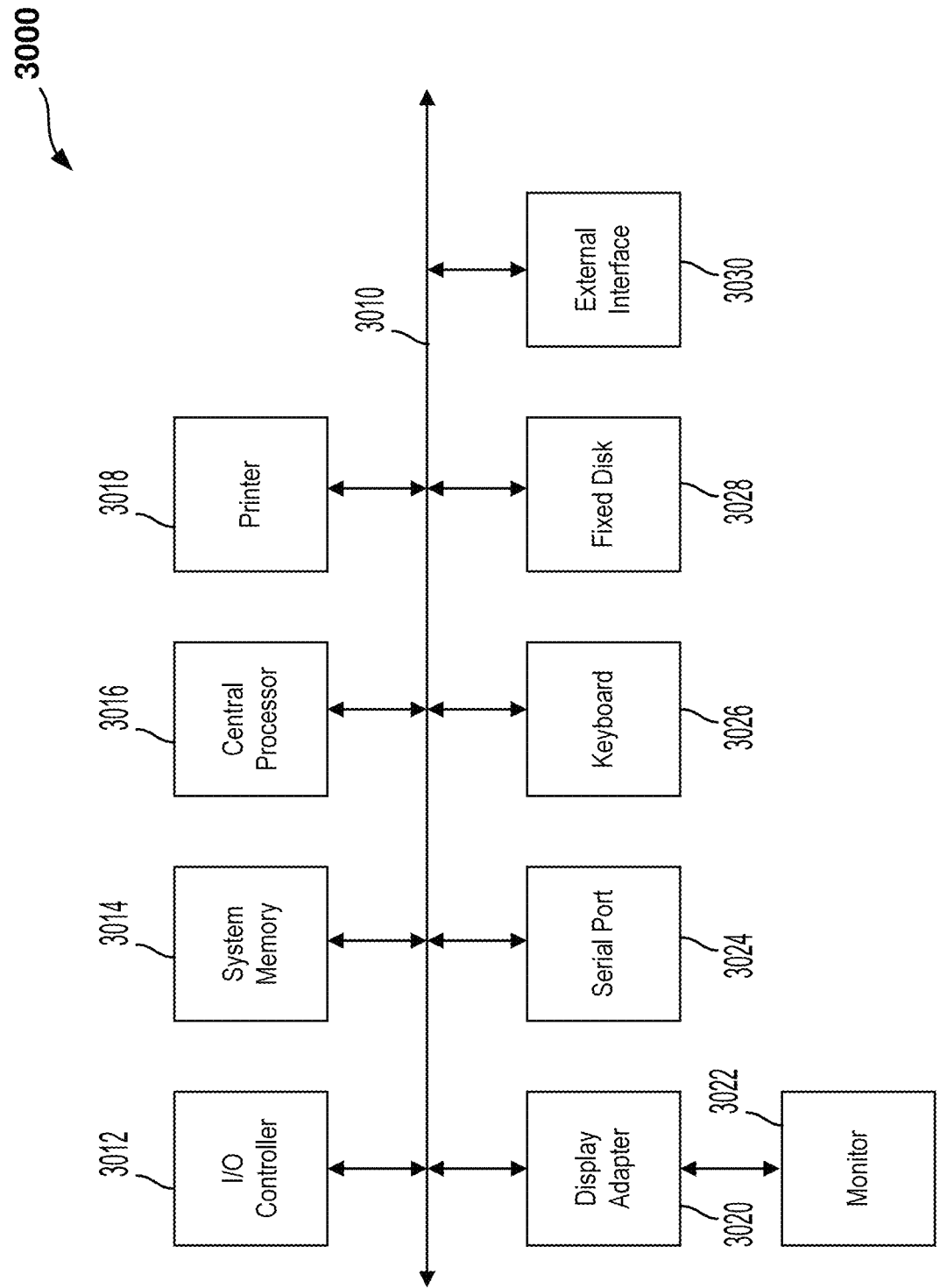
FIG. 4 presents a block diagram of a computer apparatus, according to at least aspect of the present disclosure.

FIG. 4 is a block diagram of a computer apparatus 3000 with data processing subsystems or components, which a set of instructions to perform any one or more of the methodologies discussed herein may be executed, according to at least one aspect of the present disclosure. The subsystems shown in FIG. 4 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

Figure 5:
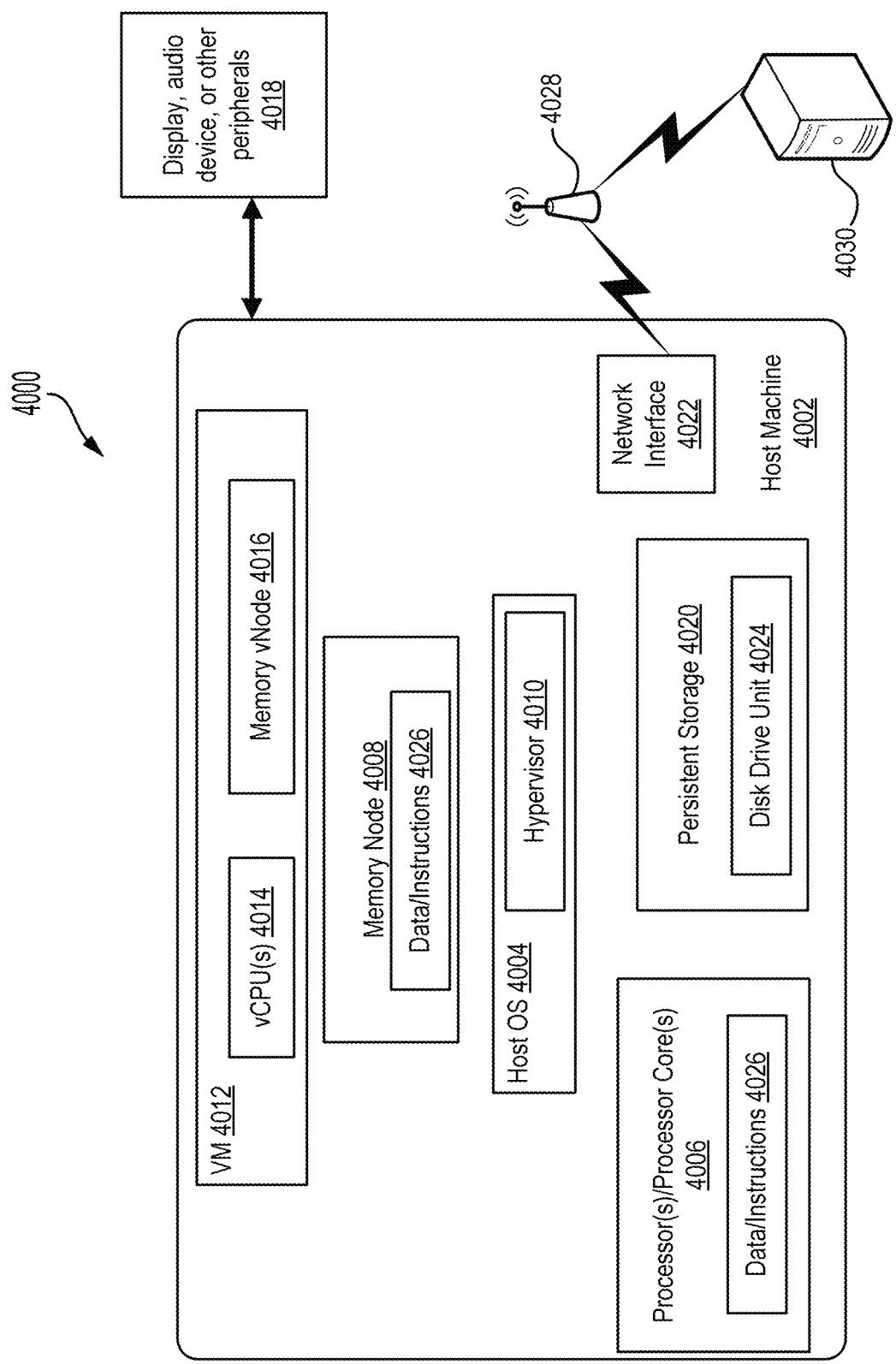
FIG. 5 is a diagrammatic representation of an example system that includes a host machine within which a set of instructions to perform any one or more of the methodologies discussed herein may be executed.

FIG. 5 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 3002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34b is analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method according to various aspects of the present disclosure are provided below in the following numbered clauses. An aspect of the method may include any one or more than one, and any combination of, the numbered clauses described below.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A. B. and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to." "related to," or other past-tense adjectives are generally not intended to exclude such variants, unless context dictates otherwise.

It is worthy to note that any reference to "one aspect," "an aspect." "an exemplification." "one exemplification," and the like means that a particular feature, structure, or characteristic described in connection with the aspect is included in at least one aspect. Thus, appearances of the phrases "in one aspect." "in an aspect." "in an exemplification," and "in one exemplification" in various places throughout the specification are not necessarily all referring to the same aspect. Furthermore, the particular features, structures or characteristics may be combined in any suitable manner in one or more aspects.

As used herein, the term "comprising" is not intended to be limiting, but may be a transitional term synonymous with "including." "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A system, comprising:
a registry with a unique coordinate system that differs from a coordinate system of one or more registry applications executed by the system;
an automated registry server connected to the registry and comprising a processor and anon-transitory machine readable medium storing code, which when executed by a processor is configured to:
receive, from a registry application executed by the system, a resource to be registered in the registry;
process contents of the resource to identify a target reference by:
parsing the resource to identify the target reference; and
identifying a reference style of the target reference;
search the registry for the target reference using information specific to the target reference, wherein the information comprises the reference style of the target reference;
analyze potential candidate matches for the target reference, in a search result of the search; and
resolve the target reference based on the analyzing of the potential candidate matches.

2. The system of claim 1, wherein the automated registry server is further configured to:
determine a match to the target reference, from the potential candidate matches to the target reference.

3. The system of claim 1, wherein the resolving of the target reference comprises at least one of:
mapping a match from the potential candidate matches to the target reference;
displaying the potential candidate matches as selectable options to a user, via a user interface; and
rejecting the target reference in the resource.

4. The system of claim 3, wherein the automated registry server is further configured to:
record the mapping to the target reference in a list of mappings.

5. The system of claim 3, wherein the automated registry server is further configured to:
register the resource in the registry, with the mapped target reference.

6. The system of claim 1, wherein the processing of the contents of the resource comprises parsing the contents for potential target references.

7. The system of claim 1, wherein the processing of the contents of the resource comprises:
identifying a potential target reference;
determining that a data type of the potential target reference is a valid data type and is supported by the registry; and
recognizing, based on the determining, the potential target reference as a target reference.

8. The system of claim 1, wherein the analyzing of the potential candidate matches comprises identifying at least one of no match with the information, a partial match with the information, or an exact match with the information.

9. The system of claim 1, wherein the analyzing of the potential candidate matches comprises:
parsing a data content of at least one candidate match of the potential candidate matches; and
determining whether the data content matches at least a portion of the information.

10. The system of claim 1, wherein the information further comprises metadata, name data, namespace data, data type information, user generated metadata, or schema information.

11. The system of claim 1 wherein the automated registry server is further configured to:
extract, from the resource, the information specific to the target reference to be used in the search.

12. A method, comprising:
receiving, from a registry application, a resource to be registered in a registry, wherein the registry has a unique coordinate system that differs from a coordinate system of the registry application;
processing contents of the resource to identify a target reference by:
parsing the resource to identify the target reference; and
identifying a reference style of the target reference;
searching the registry for the target reference using information specific to the target reference, wherein the information comprises the reference style of the target reference;
analyzing candidate matches for the target reference, in a search result of the search; and
resolving the target reference based on the analyzing of the candidate matches.

13. The method of claim 12, further comprising:
determining a match from the candidate matches to the target reference.

14. The method of claim 12, wherein the resolving of the target reference comprises at least one of:
mapping a match from the candidate matches to the target reference;
displaying the candidate matches as selectable options to a user, via a user interface; and
rejecting the target reference in the resource.

15. The method of claim 14, further comprising:
registering the resource in the registry, with the mapped target reference.

16. The method of claim 12, wherein the processing of the contents of the resource comprises parsing the contents for potential target references.

17. The method of claim 12, wherein the processing of the contents of the resource comprises:
identifying a potential target reference;
determining that a data type of the potential target reference is a valid data type and is supported by the registry; and
recognizing, based on the determining, the potential target reference as a target reference.

18. The method of claim 12, wherein the analyzing of the candidate matches comprises:
parsing a data content of at least one candidate match of the candidate matches; and
determining whether the data content matches at least a portion of the information.

19. The method of claim 12, further comprising:
extracting, from the resource, the information specific to the target reference to be used in the search.

20. A non-transitory machine readable medium storing code, which when executed by a processor is configured to:
receive, from a registry application, a resource to be registered in a registry, wherein the registry has a unique coordinate system that differs from a coordinate system of the registry application;
process contents of the resource to identify a target reference by:
  parsing the resource to identify the target reference; and
  identifying a reference style of the target reference;
search the registry for the target reference using information specific to the target reference, wherein the information comprises the reference style of the target reference;
analyze potential candidate matches for the target reference, in a search result of the search; and
resolve the target reference based on the analyzing of the potential candidate matches.

\* \* \* \* \*